United States Patent [19]

Kadokura et al.

[11] Patent Number: 4,704,266

[45] Date of Patent: Nov. 3, 1987

[54] METHOD FOR PRODUCING LITHIUM ALUMINATE POWDERS

[75] Inventors: Hidekimi Kadokura; Hiroshi Umezaki; Hideaki Murakami; Toshiyuki Mizoe, all of Niihama, Japan

[73] Assignee: Sumitomo Chemical Company, Limited, Osaka, Japan

[21] Appl. No.: 872,901

[22] Filed: Jun. 11, 1986

[30] Foreign Application Priority Data

Jun. 20, 1985 [JP] Japan ............................... 60-135720

[51] Int. Cl.$^4$ ............................................... C01F 7/04
[52] U.S. Cl. .................................... 423/600; 423/119; 423/179.5
[58] Field of Search .................... 423/119, 179.5, 600, 423/590, 625

[56] References Cited

U.S. PATENT DOCUMENTS

| | | | |
|---|---|---|---|
| 4,083,919 | 4/1978 | Pearlman | 423/600 |
| 4,115,632 | 9/1978 | Kinoshita et al. | 423/119 |

FOREIGN PATENT DOCUMENTS

| | | | |
|---|---|---|---|
| 1502000 | 10/1966 | France | 423/119 |
| 60-65719 | 4/1985 | Japan | 423/600 |
| 1189365 | 4/1970 | United Kingdom | 423/119 |

OTHER PUBLICATIONS

*Chemical Abstracts,* vol. 69, 1968, p. 10388, Abstract No. 110836j, Semenov et al.

Mat. Res. Bull., vol. 14, No. 10, 1979, pp. 1357–1368, Kinoshita et al, "Synthesis of Fine Particle Size Lithium Aluminate for Application in Molten Carbonate Fuel Cells".

*Primary Examiner*—Patrick P. Garvin
*Assistant Examiner*—Paige C. Harvey
*Attorney, Agent, or Firm*—Stevens, Davis, Miller & Mosher

[57] ABSTRACT

A method for producing $\gamma$-form lithium aluminate powders usable as a material for an electrolyte tile of molten carbonate fuel cells which comprises mixing aluminum alkoxide with one member selected from the group consisting of the lithium salts of inorganic and organic acids, lithium hydroxide and lithium oxide in the presence of a non-aqueous solvent, carrying out reaction with addition of water of 1.5 to 20 moles (including water of crystallization contained in the lithium compound) based on 1 mole of aluminum alkoxide with stirring, and removing the solvent to obtain a solid matter which is then calcined at a temperature in a range of from 650° C. to 1000° C.

5 Claims, No Drawings

METHOD FOR PRODUCING LITHIUM ALUMINATE POWDERS

The present invention relates to a method for producing lithium aluminate powders. More particularly, it relates to a method for producing fine lithium aluminate powders having a large surface area which can be used as a material for an electrolyte tile of molten carbonate fuel cells.

The electrolyte tile of molten carbonate fuel cells holds a molten alkali carbonate ($Li_2CO_3/K_2CO_3$) at a temperature in the vicinity of 650° C., and therefore, a material for this electrolyte tile needs to be fine powders having a large surface area as well as thermal resistance and alkali resistance. At present, lithium aluminate ($LiAlO_2$) is selected for the material in terms of stability to the molten carbonate, and $\gamma$-form lithium aluminate powders having a surface area of not less than 15 $m^2/g$ are desired in terms of electrolyte-holding power and thermal stability. For producing lithium aluminate used for the electrolyte tile, the following methods are known:

(1) Alumina ($\gamma$-$Al_2O_3$ or $\alpha$-$Al_2O_3$) and $Li_2CO_3$ are dry-mixed and heat-treated [Japanese Patent Application Kokai (Laid-open) No. 48600/1977].

(2) Alumina ($\gamma$-$Al_2O_3$ or $\alpha$-$Al_2O_3$) and lithium hydroxide are wet-mixed, dried and then heat-treated (ibid., No. 136638/1978).

(3) Alumina and lithium hydroxide are heat-treated in flux (NaCl/KCl or LiCl/KCl) (ibid., No. 45113/1978).

(4) A mixture of aluminum alkoxide and lithium alkoxide is hydrolyzed, and the resulting powder is heat-treated (ibid., No. 87772/1983).

$\gamma$-Form lithium aluminate obtained by the methods (1) and (2) have a large particle diameter and a small surface area, these methods having a defect that only such lithium aluminate can be produced. Lithium aluminate powders obtained by the method (3) are of a $\gamma$-form and have a relatively large surface area of 10 to 20 $m^2/g$, but this method has a defect that complete removal of the chloride used as flux is impossible. Lithium aluminate powders obtained by the method (4) are fine and $\gamma$-form ones having a large surface area, but this method has a defect that lithium alkoxide, a material, is difficult to handle because it has a large hygroscopicity and is easy to form aggregates, and also that it is expensive and not readily available.

The present inventors extensively studied to solve these problems as described above, and as a result, found that lithium aluminate powders, obtained by mixing aluminum alkoxide and a lithium compound in the presence of a non-aqueous solvent, followed by the hydrolysis of aluminum alkoxide in a specific condition and calcination, are fine and have a large surface area, being suitable as a material for the electrolyte tile of molten carbonate fuel cells. The present inventors thus completed the present invention.

The present invention provides a method for producing $\gamma$-form lithium aluminate powders characterized in that aluminum alkoxide is mixed with one member selected from the group consisting of the lithium salts of inorganic and organic acids, lithium hydroxide and lithium oxide in the presence of a non-aqueous solvent, reaction is carried out with addition of water of 1.5 to 20 moles based on 1 mole of aluminum alkoxide with stirring, and the solvent is removed to obtain a solid matter which is then calcined at a temperature in a range of from 650° C. to 1000° C.

Aluminum alkoxide used in the method of the present invention is at least one member selected from aluminum alkoxides having a $C_1$-$C_{10}$ alkyl group such as aluminum methoxide, aluminum ethoxide, aluminum isopropoxide, aluminum n-propoxide, aluminum n-butoxide, aluminum isobutoxide, aluminum tert-butoxide, aluminum pentoxide, aluminum hexoxide, aluminum heptoxide, aluminum octoxide, aluminum nonoxide, aluminum decoxide, etc.

The lithium compound used in the method of the present invention is at least one member selected from the group consisting of inorganic acid lithium salts such as lithium chloride, lithium bromide, lithium iodide, lithium fluoride, lithium sulfate, lithium nitrate, lithium carbonate, etc.; organic acid lithium salts such as lithium acetate, lithium citrate, lithium oxalate, etc.; and lithium hydroxide, lithium oxide, etc.

Lithium salt hydrates such as lithium acetate dihydrate, lithium citrate tetrahydrate, lithium hydroxide monohydrate, etc. are preferred because lithium aluminate having particularly a large specific surface area is produced probably because water of crystallization reacts with aluminum alkoxide.

The non-aqueous solvent used in the method of the present invention is one capable of dissolving aluminum alkoxide, and such solvent includes alcohols (e.g. methanol, ethanol, propanol, butanol, pentanol, hexanol, octanol, decanol), saturated aliphatic hydrocarbons (e.g. hexane, heptane, octane, paraffin oil, kerosene), unsaturated aliphatic hydrocarbons (e.g. pentene, hexene, heptene, octene, decene), alicyclic compounds (e.g. cyclopentane, cyclohexane, cyclohexene), aromatic hydrocarbons (e.g. benzene, toluene), ketones (e.g. acetone, methyl ethyl ketone, methyl isobutyl ketone), ethers, (e.g. diethyl ether, tetrahydrofuran, dioxane), etc. These solvents may be used alone or in combination.

In the method of the present invention, reactions such as hydrolysis of aluminum alkoxide, etc. occur when aluminum alkoxide is mixed with the lithium compound in the presence of the non-aqueous solvent and a prescribed amount of water is added thereto. The amount of water added here is 1.5 to 20 moles, preferably 2 to 15 moles, including water of crystallization contained in the lithium compound based on 1 mole of aluminum alkoxide, a material. Amounts of water less than 1.5 moles are insufficient for complete hydrolysis, leaving undecomposed organic groups. Amounts of water more than 20 moles produce aggregates of lithium aluminate, giving only lithium aluminate having a small specific surface area.

Water may be used for reaction in a liquid or gaseous form or in dilution with a non-aqueous solvent or inert gas. Generally, however, water is used in the liquid form in terms of the efficiency of reaction.

In order to carry out uniform reaction, the reaction system needs to be thoroughly stirred. For stirring, mechanical stirring with stirrers may be applied, or the reaction solution may be caused to flow by means of a pump, etc.

After reaction, the solvent is removed, in which case a part of excess water is also removed. For removing the solvent, the well-known techniques such as removal by vaporization, filtration, centrifugation, spray drying, etc. may be used. When the lithium compound is soluble in the solvent, however, removal by vaporization, spray drying, etc. are used. When the solvent is removed from a wet mixture by these methods, the solid matter is obtained in a powdery form.

In the present invention, calcination is carried out at a temperature in a range of, generally, from 650° C. to 1000° C., preferably from 700° C. to 950° C. At calcination temperatures lower than 650° C., lithium aluminate composed mainly of amorphous or β-form lithium aluminate is formed. At calcination temperatures higher than 1000° C., lithium aluminate having a large particle diameter and a small surface area is unpreferably produced. Calcination may directly be applied to powdery solid products obtained by removing the solvent from reaction products obtained from aluminum alkoxide, the lithium compound and water. It is however preferred to apply milling or mixing treatment to the powdery solid products prior to calcination for the purposes of milling the secondary aggregates and homogenization, because γ-form lithium aluminate having a small particle diameter and a large specific surface area is obtained by such treatment. For milling or mixing treatment, apparatus such as ball mills, vibrating mills, attrition mills, grinding mixers, V-type mixers, etc. are used.

Lithium aluminate obtained by the method of the present invention contains not less than 70% of lithium aluminate having a γ-crystal form, the rest being lithium aluminate having a β-crystal form. This lithium aluminate, because of its small particle diameter and its surface area as large as about 15 m$^2$/g or more, is preferably used as a material for the electrolyte tile of molten carbonate fuel cells.

The method of the present invention will be illustrated in more detail with reference to the following examples, but the present invention is not limited to these examples so far as the gist of the present invention is observed.

EXAMPLE 1

To a 20-liter reactor equipped with a stirrer, a condenser, etc. were added 4,080 g of aluminum isopropoxide, 840 g of lithium hydroxide monohydrate (LiOH·H$_2$O) and 8 kg of isopropyl alcohol, and aqueous dilute isopropyl alcohol comprising 3.6 kg of isopropyl alcohol and 1,800 g of water was added over 2 hours to carry out reaction while maintaining the temperature at 80° to 82° C. with stirring at 100 rpm. Thereafter, isopropyl alcohol was removed by evaporation at 82° C. to obtain 1,500 g of dry powders. The dry powders were treated for 2 hours on a vibrating mill and calcined in a condition shown in Table 1. The physical properties of the calcined product obtained were as shown in the physical property column of Table 1.

EXAMPLES 2 TO 8

In the same manner as in Example 1, various aluminum alkoxides and various lithium compounds were mixed as shown in Table 1 in the presence of a non-aqueous solvent and hydrolyzed in conditions shown in Table 1. Thereafter, the solvent was removed to dryness by evaporation in conditions shown in Table 1, and the dry powders obtained were treated on a vibrating mill (no treatment for Example 8) and then calcined in conditions shown in Table 1. The physical properties of the powdery calcined products were shown in the physical property column of Table 1.

COMPARATIVE EXAMPLE 1

Procedure was carried out in the same manner as in Example 1 except that calcination was carried out at varying temperatures of 600° C. and 1100° C. for 1 hour. The physical properties of the resulting calcined products were as shown in Table 2.

COMPARATIVE EXAMPLE 2

Procedure was carried out in the same manner as in Example 5 except that calcination was carried out at varying temperatures of 600° C. and 1100° C. for 1 hour. The physical properties of the resulting calcined products were as shown in Table 2.

COMPARATIVE EXAMPLE 3

To the same reactor as used in Example 1 were added 4,080 g of aluminum isopropoxide, 840 g of lithium hydroxide monohydrate (LiOH·H$_2$O) and 8 kg of isopropyl alcohol, and 10.8 kg of water was added over 4 hours to carry out reaction in the same condition as in Example 1. Thereafter, isopropyl alcohol was removed by evaporation at 82° C. to obtain 2,300 g of dry powders, which however formed rigid aggregates. The dry powders were treated for 2 hours on a vibrating mill and calcined in conditions shown in Table 2. The physical properties of the resulting calcined product were as shown in Table 2.

COMPARATIVE EXAMPLE 4

To the same reactor as used in Example 1 were added 4,080 g of aluminum isopropoxide, 840 g of lithium hydroxide monohydrate (LiOH·H$_2$O) and 8 kg of isopropyl alcohol, and aqueous dilute isopropyl alcohol comprising 3.6 kg of isopropyl alcohol and 0.11 kg of water was added over 2 hours to carry out reaction in the same condition as in Example 1. Thereafter, isopropyl alcohol was removed by evaporation at 82° C. to obtain 1.8 kg of dry powders. The dry powders were treated for 2 hours on a vibrating mill and calcined at 800° C. for 1 hour. The physical properties of the resulting calcined product are as shown in Table 1, showing that only γ-form lithium aluminate having a small surface area is obtained.

From Examples described above, it is apparent that fine γ-form lithium aluminate having a large surface area can stably be produced by the method of the present invention.

TABLE 1

| | | Examples | | |
|---|---|---|---|---|
| | | Example No. | | |
| | | 1 | 2 | 3 |
| Material | Aluminum alkoxide | Aluminum isopropoxide | Aluminum isopropoxide | Aluminum isopropoxide |
| | Amount, Kg (Al-mole) | 4.08 (20) | 4.08 (20) | 4.08 (20) |
| | Lithium compound | LiOH·H$_2$O | LiOH·H$_2$O | LiOH·H$_2$O |
| | Amount, Kg (Li-mole) | 0.84 (20) | 0.84 (20) | 0.84 (20) |
| | Solvent | Isopropyl alcohol | Isopropyl alcohol | Isopropyl |

TABLE 1-continued

| | | Examples | | | | | | | |
|---|---|---|---|---|---|---|---|---|---|
| | Amount, Kg | 8 | | | 8 | | | alcohol 8 | |
| Hydrolysis condition | Amount of water supplied, Kg (mole) | 1.8 (100) | | | 1.8 (100) | | | 0.72 (40) | |
| | Solvent for dilution | Isopropyl alcohol | | | None | | | Isopropyl alcohol | |
| | Amount, Kg | 3.6 | | | 0 | | | 3.6 | |
| | Temperature, °C. | 80–82 | | | 80–82 | | | 80–82 | |
| | Time, hr | 2 | | | 2 | | | 2 | |
| Solvent removing condition | Temperature, °C. | 82 | | | 82 | | | 82 | |
| | Amount of dry powders, Kg | 1.5 | | | 1.5 | | | 1.4 | |
| Dry-milling condition | Mill | Vibrating mill | | | Vibrating mill | | | Vibrating mill | |
| | Time, hr | 2 | | | 2 | | | 2 | |
| Calcination condition | Temperature, °C. | 700 | 800 | 1000 | 700 | 800 | 1000 | 800 | |
| | Time, hr | 1 | 1 | 1 | 1 | 1 | 1 | 1 | |
| Physical properties of product | Crystal form* | γ-Form β-Form | γ-Form | γ-Form | γ-Form β-Form | γ-Form | γ-Form | γ-Form | |
| | (%) | 85   15 | 100 | 100 | 90   10 | 100 | 100 | 100 | |
| | Specific surface area, m²/g | 35 | 29 | 20 | 31 | 26 | 18 | 27 | |

| | | Example No. | | | | |
|---|---|---|---|---|---|---|
| | | 4 | 5 | 6 | 7 | 8 |
| Material | Aluminum alkoxide | Aluminum isopropoxide | Aluminum ethoxide | Aluminum isopropoxide | Aluminum isopropoxide | Aluminum isopropoxide |
| | Amount, Kg (Al-mole) | 4.08 (20) | 3.24 (20) | 4.08 (20) | 4.08 (20) | 4.08 (20) |
| | Lithium compound | $LiOH \cdot H_2O$ | $LiOH \cdot H_2O$ | $CH_3COOLi \cdot 2H_2O$ | $Li_2CO_3$ | $LiOH \cdot H_2O$ |
| | Amount, Kg (Li-mole) | 0.84 (20) | 0.84 (20) | 2.04 (20) | 0.74 (20) | 0.84 (20) |
| | Solvent | Isopropyl alcohol | Ethyl alcohol | Isopropyl alcohol | Isopropyl alcohol | Isopropyl alcohol |
| | Amount, Kg | 8 | 8 | 8 | 8 | 8 |
| Hydrolysis condition | Amount of water supplied, Kg (mole) | 5.4 (300) | 1.8 (100) | 1.8 (100) | 1.8 (100) | 1.8 (100) |
| | Solvent for dilution | Isopropyl alcohol | Ethyl alcohol | Isopropyl alcohol | Isopropyl alcohol | Isopropyl alcohol |
| | Amount, Kg | 5.4 | 3.6 | 3.6 | 3.6 | 3.6 |
| | Temperature, °C. | 80–82 | 76–78 | 80–82 | 80–82 | 80–82 |
| | Time, hr | 2 | 2 | 2 | 2 | 2 |
| Solvent removing condition | Temperature, °C. | 82 | 78 | 82 | 82 | 82 |
| | Amount of dry powders, Kg | 1.9 | 1.4 | 1.5 | 1.5 | 1.5 |
| Dry-milling condition | Mill | Vibrating mill | Vibrating mill | Vibrating mill | Vibrating mill | None |
| | Time, hr | 2 | 2 | 2 | 2 | — |
| Calcination condition | Temperature, °C. | 800 | 700   800   1000 | 800 | 800 | 800 |
| | Time, hr | 1 | 1   1   1 | 1 | 1 | 1 |
| Physical properties of product | Crystal form* | γ-Form | γ-Form  β-Form  γ-Form | γ-Form | γ-Form | γ-Form |
| | (%) | 100 | 85   15   100   100 | 100 | 100 | 100 |
| | Specific surface area, m²/g | 20 | 36   29   20 | 30 | 17 | 22 |

*"β-Form", "γ-Form": Indicate the crystal form of lithium aluminate.

TABLE 2

| | | Comparative Examples | | | |
|---|---|---|---|---|---|
| | | Comparative Example No. | | | |
| | | 1 | 2 | 3 | 4 |
| Material | Aluminum alkoxide | Aluminum isopropoxide | Aluminum ethoxide | Aluminum isopropoxide | Aluminum isopropoxide |
| | Amount, Kg (Al-mole) | 4.8 (20) | 3.24 (20) | 4.08 (20) | 4.08 (20) |
| | Lithium compound | $LiOH \cdot H_2O$ | $LiOH \cdot H_2O$ | $LiOH \cdot H_2O$ | $LiOH \cdot H_2O$ |
| | Amount, Kg (Li-mole) | 0.84 (20) | 0.84 (20) | 0.84 (20) | 0.84 (20) |
| | Solvent | Isopropyl alcohol | Ethyl alcohol | Isopropyl alcohol | Isopropyl alcohol |
| | Amount, Kg | 8 | 8 | 8 | 8 |
| Hydrolysis condition | Amount of water supplied, Kg (mole) | 1.8 (100) | 1.8 (100) | 10.8 (600) | 0.11 (6) |
| | Solvent for dilution | Isopropyl alcohol | Ethyl alcohol | None | Isopropyl alcohol |
| | Amount, Kg | 3.6 | 3.6 | 0 | 3.6 |
| | Temperature, °C. | 80–82 | 76–78 | 80–82 | 80–82 |
| | Time, hr | 2 | 2 | 4 | 2 |
| Solvent removing condition | Temperature, °C. | 82 | 78 | 82 | 82 |
| | Amount of dry powders, Kg | 1.5 | 1.4 | 2.3 | 1.8 |
| Dry- | Mill | Vibrating mill | Vibrating | Vibrating mill | Vibrating |

TABLE 2-continued

| | | Comparative Examples Comparative Example No. | | | | | | | | | |
|---|---|---|---|---|---|---|---|---|---|---|---|
| | | 1 | | 2 | | 3 | | | | | 4 |
| milling condition | Time, hr | mill 2 | | mill 2 | | 2 | | | | | mill 2 |
| Calcination condition | Temperature, °C. Time, hr | 600 1 | 1100 1 | 600 1 | 1100 1 | 600 1 | 700 1 | 800 1 | 1000 1 | 1100 1 | 800 1 |
| Physical properties of product | Crystal form* (%) | β-Form 100 | γ-Form 100 | β-Form 100 | γ-Form 100 | β-Form 100 | β-Form 65 / γ-Form 35 | γ-Form 100 | γ-Form 100 | γ-Form 100 | γ-Form 100 |
| | Specific surface area, m²/g | 41 | 8 | 42 | 9 | 22 | 14 | 11 | 4 | 3 | 12 |

*"β-Form", "γ-Form": Indicate the crystal form of lithium aluminate.

What is claimed is:

1. A method for producing γ-form lithium aluminate powders which comprises mixing aluminum alkoxide with one member selected from the group consisting of the lithium salts of inorganic and organic acids, lithium hydroxide and lithium oxide in the presence of a non-aqueous solvent, carrying out reaction with addition of water of 1.5 to 20 moles (including water of crystallization contained in the lithium compound) based on 1 mole of aluminum alkoxide with stirring, and removing the solvent to obtain a solid matter which is then calcined at a temperature in a range of from 650° C. to 1000° C.

2. A method according to claim 1, wherein the lithium compound is lithium acetate dihydrate, lithium citrate tetrahydrate or lithium hydroxide monohydrate.

3. A method according to claim 1, wherein the amount of water added is 2 to 15 moles (including water of crystallization contained in the lithium compound) based on 1 mole of aluminum alkoxide.

4. A method according to claim 1, wherein the calcination temperature is 700° to 950° C.

5. A method according to claim 1, wherein milling or mixing treatment is applied to the solid matter prior to calcination.

* * * * *